United States Patent Office 3,361,025
Patented Jan. 2, 1968

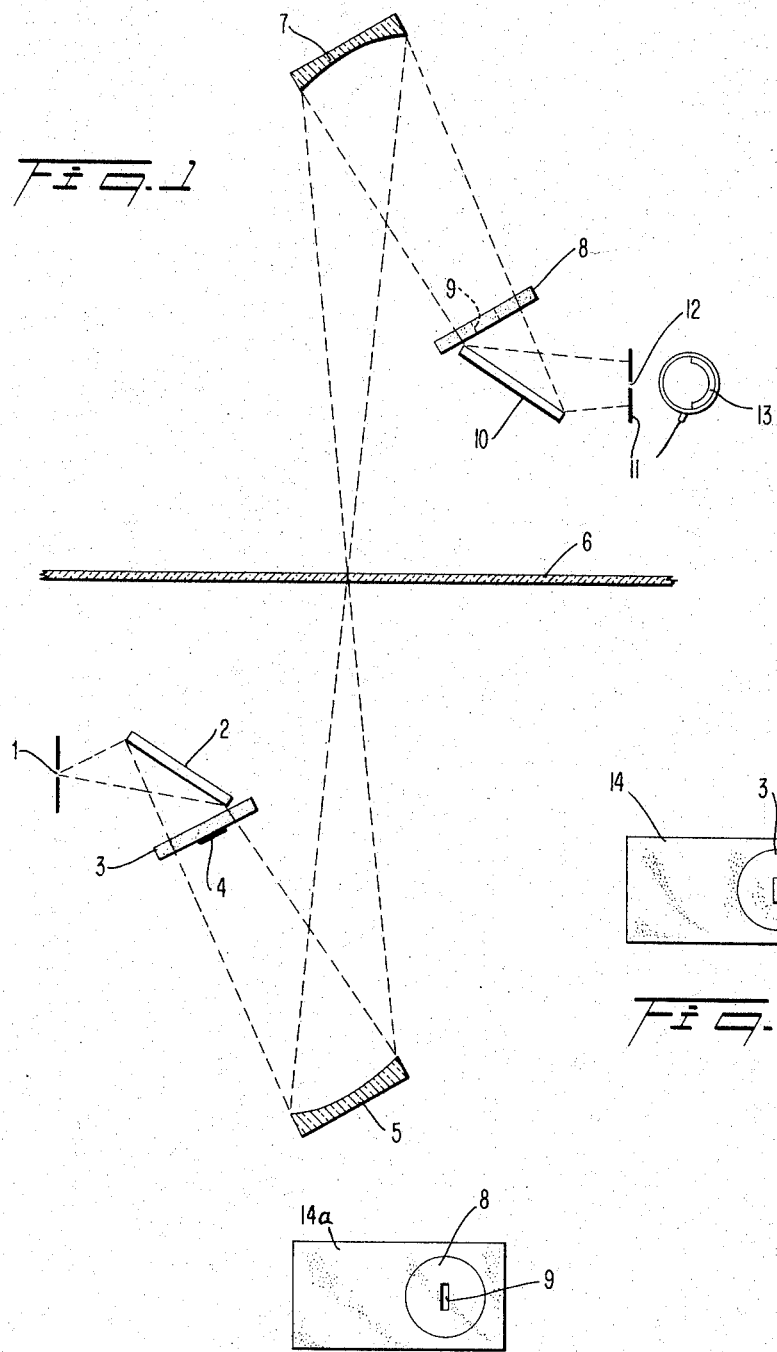

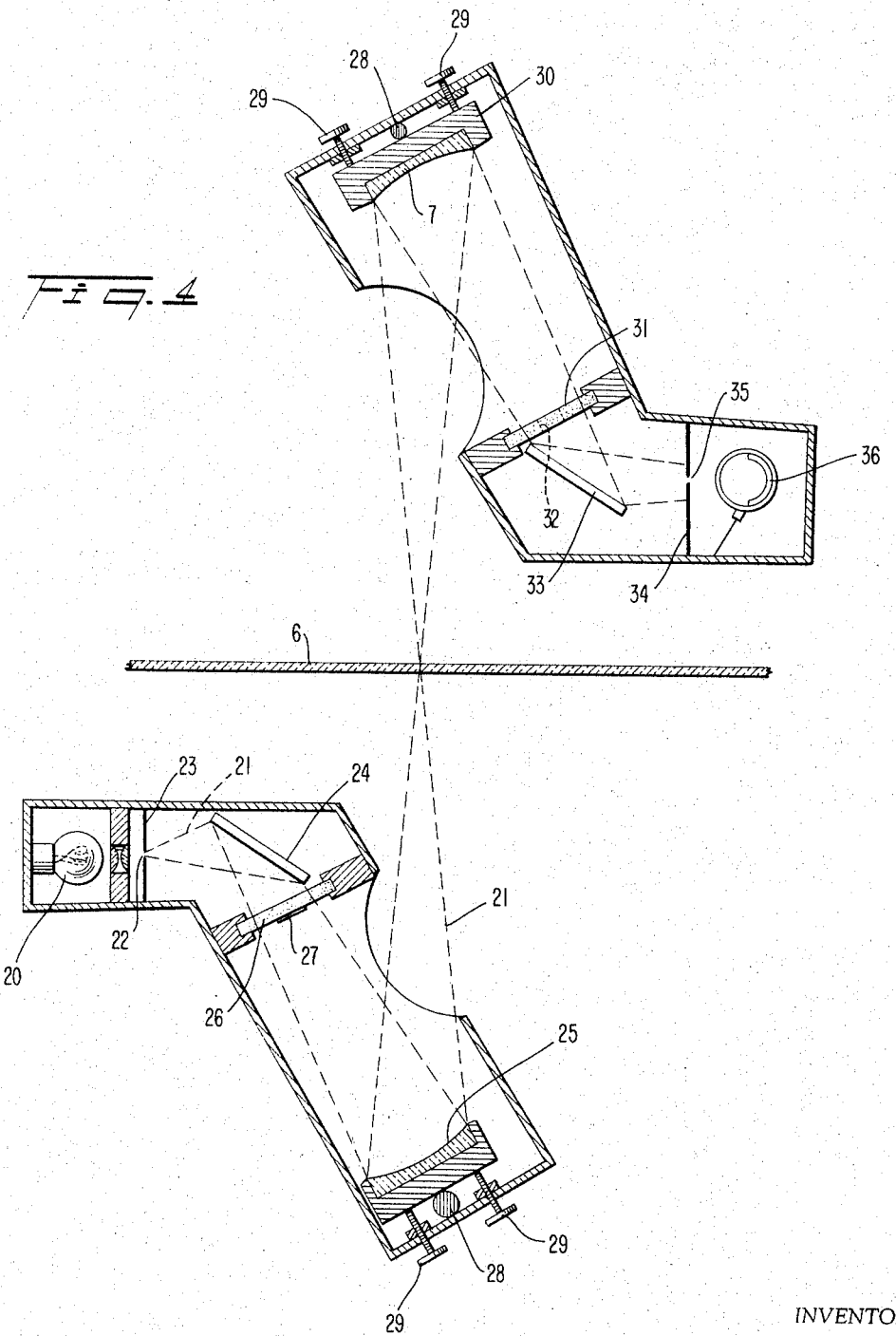

3,361,025
METHOD AND APPARATUS OF DETECTING FLAWS IN TRANSPARENT BODIES
Jean Paul Gaffard, Paris, France, assignor to Compagnie de Saint-Gobain, Neuilly-sur-Seine, France
Filed Dec. 11, 1961, Ser. No. 158,277
Claims priority, application France, Dec. 13, 1960, 846,756, Patent 1,282,633
5 Claims. (Cl. 88—14)

This invention relates to the finding and locating of imperfections in transparent materials. The problem of locating such imperfections, either surface or internal, is particularly acute in the continuous manufacture of polished glass sheet and the invention will be described in that application, but this particular description is illustrative and does not constitute a limitation.

The estimation of the polish or of the internal quality of a transparent sheet, for example a sheet of glass or of plastic, has heretofore been made by visual inspection by means of light emitted by a source and reflected or transmitted by the sheet. That process is elementary because the result depends on the keenness of vision and the experience of the observer in interpreting what he sees. The method is imperfect when applied to modern methods of making continuous sheets, which require exact methods to indicate at every instant the perfection of polish and the existence of internal defects.

An attempt has been made to resolve the problem by means of apparatus with feelers, but such inspection is too slow to be applied advantageously to continuous manufacture. Furthermore, accidental displacement of the sheet during examination, even though small, may introduce appreciable errors or an erroneous indication of defects. It is an object of the invention to examine sheets for the quality of surface and for hidden or internal imperfections by measuring the light which is diffused by defects in the surface or the body of the sheet.

The objects are accomplished, generally speaking, by passing a clear, unwavering beam of light, preferably of point or line type, through a moving transparent sheet toward a dead target and an electric circuit activator such as a light responsive electric cell which are so arranged that the cell is not activated by the undeflected beam but is struck and activated when a part of the beam is deflected by an imperfection in the sheet. As to method the objects are accomplished by a method of locating imperfections of finish and construction in moving transparent sheets which comprises focussing a beam of light upon the sheet, providing within the beam an area which is substantially dark, and transforming light rays deflected into the dark area into signals. As to apparatus the objects are accomplished by apparatus for locating imperfections in transparent sheets comprising means to move a transparent sheet along a path, a source of light on one side of the sheet optically directed toward a dead target on the other side, a responsive target adjacent the dead target, and means to pass rays from the source, which are deflected by imperfections in the sheet, to the responsive target.

According to the invention, a point image of a source of light is focussed on the moving sheet by optical means and the light which passes through the sheet is directed by optical means toward a photosensitve apparatus such as a responsive cell. A filter and a counter filter are placed on opposite sides of the sheet within the beam of light so that they are optically conjugated. By this means no light or an even quantity of a fainter light will reach the counter filter, so long as the polish is perfect and no internal defects affect the light as it passes through the glass, but when a defect appears the light will be diffused or refracted through the counter filter upon the cell which will be activated to give an appropriate warning. As apparatus for warning, activated by photoelectric means, is well known no description thereof will be given in this specification.

When the transparent surface is perfectly polished, there is no diffusion of the light rays and substantially no rays will pass through the counter filter, so that the photosensitve device will not be excited. It is the same if there is no defect in the sheet. On the other hand, if a defect of polish or an internal defect falls under the beam of light there will be a diffusion of the rays some of which will pass through the counter filter and excite the photosensitive apparatus. The current emitted by the photosensitive apparatus is consequently a function of the condition of polish of the surfaces and of the perfection of the sheet.

In describing the light image which is focussed on the glass as a point, it should be understood that the area of the beam should be as small as the surface of the smallest defect which one wishes to discover. When it is stated that the objects are optically conjugated it means that the image of the baffle is superimposed on the aperture in the target. The focussed spot of light should be bright.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, FIGURE 1 is the schematic view of apparatus according to the invention in operation;

FIGURE 2 is a plan view of a target constituting the filter and of the transparent plate which supports it;

FIGURE 3 is a plan view of the hole constituting the counter filter and of the opaque plate in which such hole is provided; and FIGURE 4 is a vertical sectional view through apparatus embodying the invention.

As shown in FIGURE 1 a point source of light 1 constituted by a hole in an opaque body, situated beneath a sheet of glass 6, which may be assumed to be traveling toward the right, projects a beam of light upon a flat mirror 2 which reflects it in the direction of a transparent plate 3 which has at its center a small rectangular opaque baffle 4. After having passed through the plate 3 the beam of light falls on a concave mirror 5 aligned so that the transparent plate 3 will be in its focal plane. The mirror 5 is spaced from the glass sheet 6 so that it forms the image of the source of light as a point on the glass. The diameter of the mirror is small because it is desirable to have good depth of field.

After passing through the sheet the beam strikes a concave mirror 7 which is identical with mirror 5 and is situated at the same distance from the glass sheet. The beam is thus reflected upon an opaque target 8 which is centrally pierced with an opening 9 of the same shape and size as the baffle 4, the baffle and the opening being optically conjugated. Under the opaque plate 8 is a plain mirror 10 which reflects upon a photosensitive cell 13 any light which passes through opening 9. A diaphragm 11 having aperture 12 therein, placed between the mirror 10 and the photosensitive cell 13 eliminates the major part of parasitic light.

It results from this structure that in the absence of light diffused by imperfections in the glass and disregarding the parasitic light no light will pass through the opening 9 because of its optical arrangement with respect to the baffle 4. On the other hand, the diffusion of the beam in the sheet of glass 6, which depends on the quality of the polish of the two surfaces and on internal defects has its effect to deflect some of the rays of the beam through the opening 9 upon the photocell 13. This cell will be connected to a suitable apparatus for signalling the quality of the glass at any instant, as the amount of light which passes through the opening 9 will be a function of that which is diverted by imperfections. The photosensitive instrument 13 may for example be a photomultiplier of known type.

FIGURE 2 represents in plan view the transparent plate 3 containing the absorbent baffle 4 at its center. The carrier 14 serves to mount the plate in the apparatus.

FIGURE 3 also in plan represents the opaque plate 8 which contains at its center aperture 9 which corresponds in shape and size to the baffle 4. This opaque plate is similarly mounted by carrier 14a.

The filter which, in the example, is constituted by a baffle 4 may be comprised of a phase plate or a prismatic birefringent filter, the counter filter itself being comprised of a corresponding aperture or apertures.

When the apparatus is fixed and the sheet moves, the inspection will necessarily be made along a straight line, in which case the installation of a plurality of such apparatuses is indicated if inspection is desired in more than one straight line. On the other hand, one may fix the transparent sheet and move the inspection apparatus at will over the whole sheet. It is also possible to displace both sheet and apparatus at the same time. In speaking of moving the apparatus, there is included the projection of the beam of light to whatever part of the sheet is to be inspected.

In the apparatus described above, which is preferred, the optical apparatus are comprised of mirrors, but it is equally satisfactory to employ lenses to obtain the same focus.

In FIGURE 4 is shown a practical embodiment of the apparatus wherein an incandescent light 20 projects a beam 21 through a pin hole 22 in a screen 23 which is otherwise opaque. The beam 21 strikes a flat mirror 24 and is projected toward a concave mirror 25, passing through transparent plate 26 which has a small opaque baffle 27 at its mid portion. The mirror 25 is pivotally mounted on a ball 28 and can be angularly adjusted by means of screws 29. The beam 21 is focussed by the mirror 25 on the glass sheet 6 through which it passes to the mirror 30 which is mounted similarly to mirror 25. The beam from concave mirror 30 is projected through a plate 31 which has an aperture 32 of substantially the same dimensions as the shadow of baffle 27. The beam passes to a flat mirror 33 which directs it upon the opaque target 34 which has a small aperture 35 at its center, this aperture being covered by the projected shadow of baffle 27 so long as the area of plate 6 which is traversed by the beam is free of imperfection. When imperfection occurs, the light is deflected, passes through the aperture 32 and the hole in target 34 to the photosensitive cell 36 which is activated, thus announcing the existence of a defect and its position in the sheet.

This invention constitutes a material improvement over the methods of inspection which have heretofore been employed. It is capable of detecting flaws and internal defects which are not visible, even those of most minute size.

The invention includes a process for evaluating the quality of polish and the internal perfection of a moving transparent sheet by forming a point image of a luminous source on the sheet by optical means, the rays issuing from the sheet being projected by a second optical means toward a photosensitive apparatus, a mask and counter mask being disposed so that the photocell is not illuminated except when rays are deflected by imperfections. The apparatus provides a continuous record of the inspection through the registration, on means not shown, of the output of the photoelectric cell. The apparatus involves the principle of passing the control beam of light through a transparent object which is relatively moving and the detection and measurement by photoelectric means of such portions of that light as is deflected by imperfections in the sheet.

In the claims the term "normally" refers to the conditions extant in the instrument when scanning a portion of the sheet that is essentially perfect or within acceptable standards. The term "opening" or "aperture" is inclusive of an opaque plate having a light-transmitting area of the shape, size and position defined by the claims.

As many apparently widely different embodiments of the present invention may be made without departing from the spirit and scope thereof, it is to be understood that the invention is not limited to the specific embodiments.

What is claimed is:

1. The method of detecting the presence and location of flaws in a plane sheet of transparent material moving in the plane thereof, comprising, passing light from a point source through a first plate having an opaque central area of predetermined size and shape, focusing at a point on said sheet, rays passing through said first plate, focusing said rays at the other side of said sheet toward a second opaque plate having a central opening corresponding in size and shape to the image of said opaque central area projected thereon, and detecting light deflected into and through said opening by imperfections in said sheet at the point thereof instantaneously traversed by said rays.

2. The method of inspecting a sheet of transparent material to detect and locate imperfections therein, comprising, directing rays from a point source of light through a first transparent plate at one side of said sheet and having an opaque area of predetermined size and shape centrally thereof, focusing said rays at a point on the sheet to be inspected, focusing said rays at the other side of said sheet toward a second opaque plate having a central opening therethrough corresponding in size, shape and position to the image of said opaque area projected onto said second plate, detecting rays deflected into and through said opening by imperfections in said sheet at said point, and effecting relative motion of the sheet and the focused rays.

3. The method of claim 2, said sheet being planar, said rays traversing the same in a direction normal to the plane thereof.

4. The method of claim 2, said relative motion including translating said sheet in one direction in its plane, while moving said focused point in a second direction normal to said first direction and parallel with the plane of said sheet, at a speed synchronized with the speed of translation of said sheet.

5. That method of detecing and locating imperfections in a moving transparent sheet, comprising, focusing at a point on said sheet, from one side thereof, a bundle of light rays having a dark area encompassed thereby, focusing said light rays from the other side of said sheet toward and onto an opaque element having a light transmitting opening normally in coincidence with the image of said dark area focused thereon, and generating an electric current by light rays deflected into and through said opening by an imperfection in said sheet at said point to create a signal indicative of the imperfection.

References Cited

UNITED STATES PATENTS

| | | | |
|---|---|---|---|
| 2,253,054 | 8/1941 | Tuttle et al. | 88—14 |
| 2,593,127 | 4/1952 | Fedorchak | 88—14 |
| 2,604,809 | 7/1952 | Mitchell | 88—14 |
| 2,735,331 | 2/1956 | McMaster et al. | 88—14 |
| 2,889,737 | 6/1959 | Griss et al. | 88—14 |
| 2,938,423 | 5/1960 | Rich | 88—14 |
| 3,030,516 | 4/1962 | Seavey | 88—14 |
| 3,199,401 | 8/1965 | Sleighter et al. | 88—14 |

FOREIGN PATENTS 1,179,813  12/1958  France.

JEWELL H. PEDERSEN, *Primary Examiner.*

T. L. HUDSON, C. E. QUARTON, *Assistant Examiners.*